United States Patent [19]
Emody et al.

[11] Patent Number: 6,145,803
[45] Date of Patent: Nov. 14, 2000

[54] QUICK RELEASE MOTOR MOUNT

[75] Inventors: Kenneth J. Emody, Carol Stream; Dusan Ivancevic, Addison, both of Ill.

[73] Assignee: IMI Cornelius Inc., Anoka, Minn.

[21] Appl. No.: 09/017,039

[22] Filed: Feb. 2, 1998

Related U.S. Application Data

[60] Provisional application No. 60/037,208, Feb. 4, 1997.

[51] Int. Cl.[7] .................................................. F16M 11/00
[52] U.S. Cl. ...................... 248/674; 99/275; 222/129.1; 248/678
[58] Field of Search .................................. 248/678, 674, 248/676, 640; 406/3; 99/275; 222/129.1

[56] References Cited

U.S. PATENT DOCUMENTS

| | | | |
|---|---|---|---|
| 4,019,704 | 4/1977 | Levine | 248/231.21 |
| 5,564,601 | 10/1996 | Cleland et al. | 222/129.1 |
| 5,975,480 | 11/1999 | Schaefer | 248/678 |

*Primary Examiner*—Ramon O. Ramirez
*Attorney, Agent, or Firm*—Sten Erik Hakanson

[57] ABSTRACT

An ice dispensing machine includes a housing defining an ice retaining bin. The bin includes an auger/dispensing wheel releasably secured to a shaft of a motor, the shaft extending through one sidewall of the ice bin. A motor mounting panel is secured to the opposite side of the sidewall and includes a plurality of keyway slots having a key receiving hole on one end and a narrower slot portion. The motor includes a similar plurality of keys extending therefrom. A further motor retaining plate is secured to the sidewall and includes two holes. A U-shaped motor retaining rod is threaded on one end and unthreaded on the other. In operation, the plurality of motor keys are aligned with the keyways and inserted into the hole ends thereof, after which the motor is rotated so that the keys are locked and retained in the narrower slot portions. The U-shaped rod is mounted around the cylindrical exterior of the motor housing whereby the two ends thereof are inserted into and through the corresponding two holes of the second motor mounting bracket. A wing nut is secured to the threaded end of the U-shaped rod and tightened thereby pulling the motor against the second motor mount bracket and securing it there to. The non threaded end is of sufficient length to simply extend through its corresponding hole so as to prevent any rotation of the U-shaped bracket.

1 Claim, 4 Drawing Sheets

6,145,803

QUICK RELEASE MOTOR MOUNT

This application claims benefit of provisional application Ser. No. 60/037,208, filed Feb. 4, 1997.

BACKGROUND OF THE INVENTION

1. Field of the Invention

The present invention relates generally to means for providing quick mounting and dismounting of a motor to a machine, and in particular to such a quick release mechanism as utilized in an ice dispensing machine.

2. Background

Ice dispensing machines are well known in the beverage dispensing art and typically include a bin for holding a volume of ice. The bin will generally include an auger/dispensing wheel for breaking up the ice and for moving it to and out of an ice dispensing door. An electric motor is used to drive a shaft that extends into the bin onto which shaft the auger/dispensing wheel is attached.

Heretofore, removal of the auger drive motor for repair or replacement has been difficult. A plurality of fastening means such as screws or bolts would need to be loosened or removed. This removal approach can be difficult as the fastening means may be in a hard to reach location or could be corroded. In either event, the result can be an increase in the cost of a service call to fix an auger motor. Such removal can be further complicated if the dispensing machine dispenses beverages in addition to ice. Such ice/drink machines by virtue of the additional hardware needed for cooling and dispensing of a plurality of beverages, offer even less room for a service technician to access the auger motor. Accordingly, it would be desirable to have a means for permitting quick installing and removal of an auger motor from ice or ice/drink dispensing machines.

SUMMARY OF THE INVENTION

An ice dispensing machine includes a housing defining an ice retaining bin. The bin includes an auger/dispensing wheel releasably secured to a shaft of a motor, the shaft extending through one sidewall of the ice bin. A motor mounting panel is secured to the opposite side of the bin sidewall and includes a plurality of keyway slots having a key receiving hole on one end and a narrower slot portion. The motor includes a similar plurality of keys extending therefrom. A farther motor retaining plate is secured to the sidewall and includes two holes. A U-shaped motor retaining rod is threaded on one end and unthreaded on the other.

In operation, the plurality of motor keys are aligned with the keyways and inserted into the hole ends thereof, after which the motor is rotated so that the keys are locked and retained in the narrower slot portions. The U-shaped rod is mounted around the cylindrical exterior of the motor housing whereby the two ends thereof are inserted into and through the corresponding two holes of the second motor mounting bracket. A wing nut is secured to the threaded end of the U-shaped rod and tightened thereby pulling the motor against the second motor mount bracket and securing it there to. The non threaded end is of sufficient length to simply extend through its corresponding hole so as to prevent any rotation of the U-shaped bracket. The auger/dispensing wheel can then be secured to the motor shaft.

It will be appreciated by those of skill that removal of the motor simply involves the reverse of the above procedure. Moreover, such removal can be accomplished without the need for any hand tools and can be done quite rapidly.

DESCRIPTION OF THE DRAWINGS

A further understanding of the structure, function, operation, objects and advantages of the present invention can be had by referring to the following detailed description which refers to the following figures, wherein.

DETAILED DESCRIPTION OF THE PREFERRED EMBODIMENT

Figure 1:
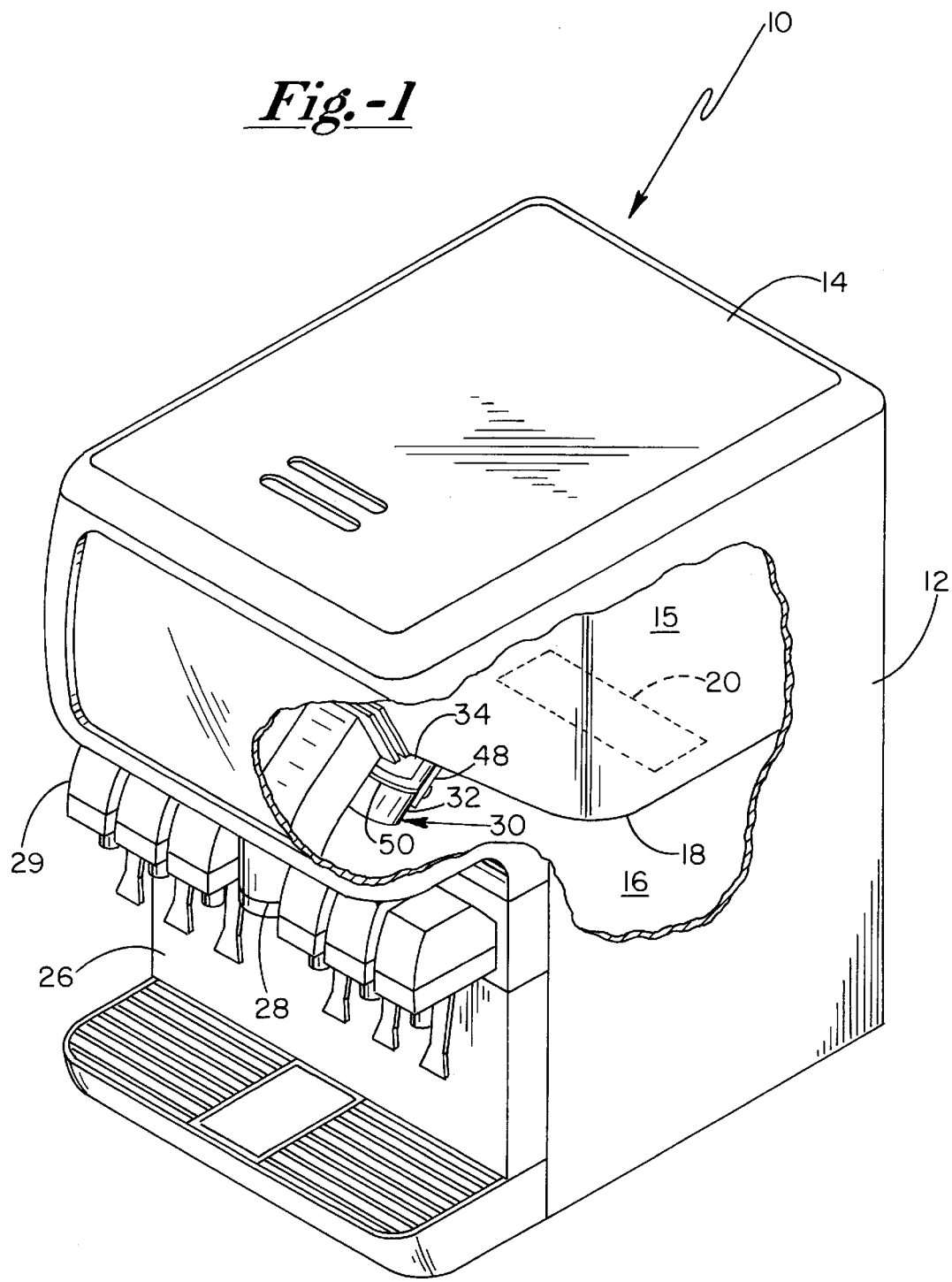
FIG. 1 shows perspective view of the present invention in the context of an ice/drink dispensing machine.
Figure 2:
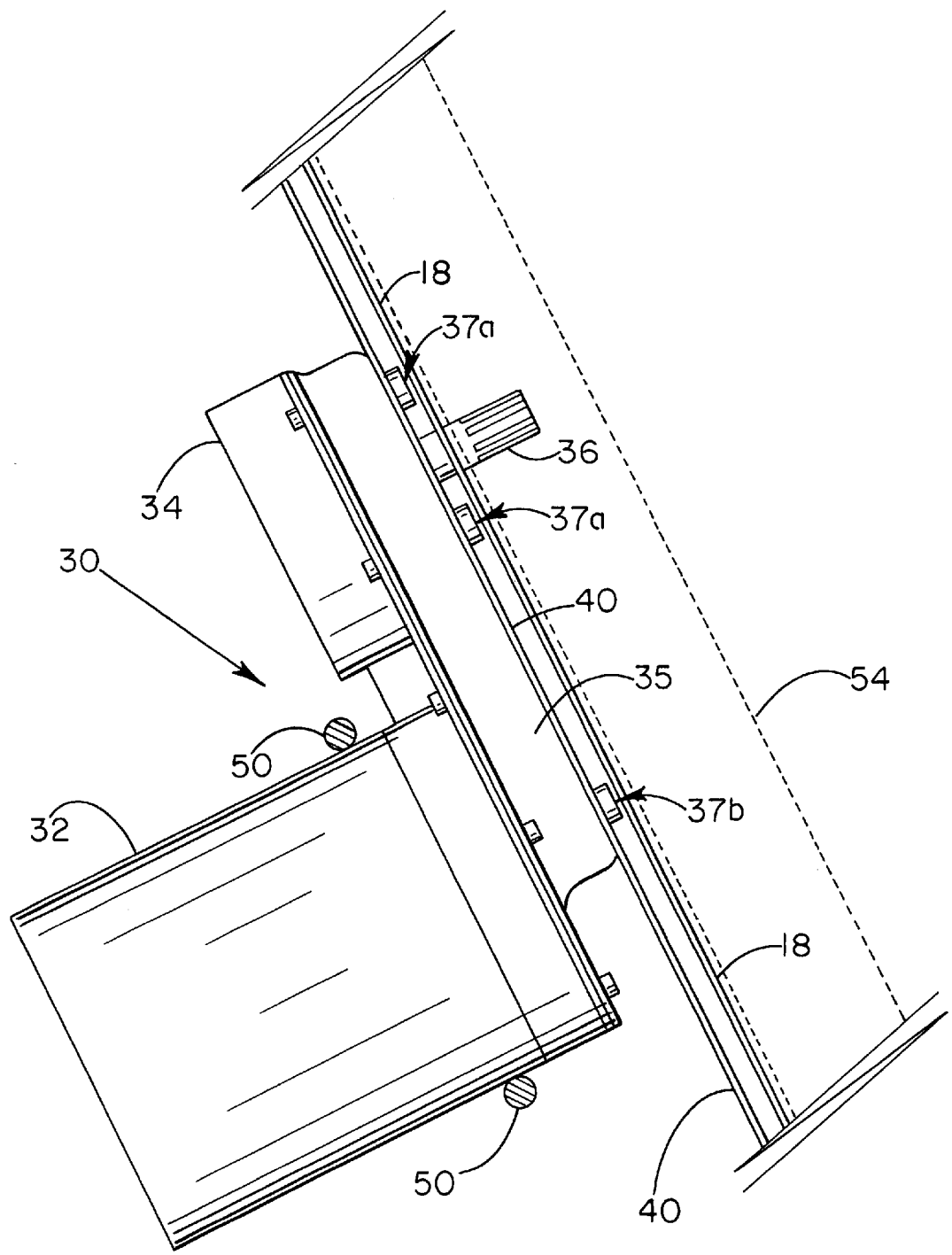
FIG. 2 shows a side plan view of a paddle wheel/auger motor of the dispenser of FIG. 1 utilizing the quick disconnect of the present invention.

An ice/drink dispenser is seen in FIG. 1, and generally indicated by the numeral 10. Dispenser 10 includes an outer housing 12 and a top access lid 14. Housing 12 includes two ice retaining areas 15 and 16 defined by a liner 18 extending there between. Liner 18 includes a hole 20 for permitting ice to fall from ice retaining area 15 down to retaining area 16. As is known in the art, upper area 15 retains ice for dispensing into cups for cooling of beverage dispensed therein, as will be further described herein below. As is also known in the art, area 16 includes a cold plate that is cooled by the ice falling and resting thereon. The cold plate provides for heat exchange cooling of various liquid beverage components flowing through beverage lines encased therein. Dispenser 10 also includes a removable front access splash panel 26, and ice dispensing chute 28 located centrally of a plurality of beverage dispensing valve mounts 29. As is understood by those of skill, a plurality of beverage dispensing valves can be secured to mounts 29.

Figure 5:
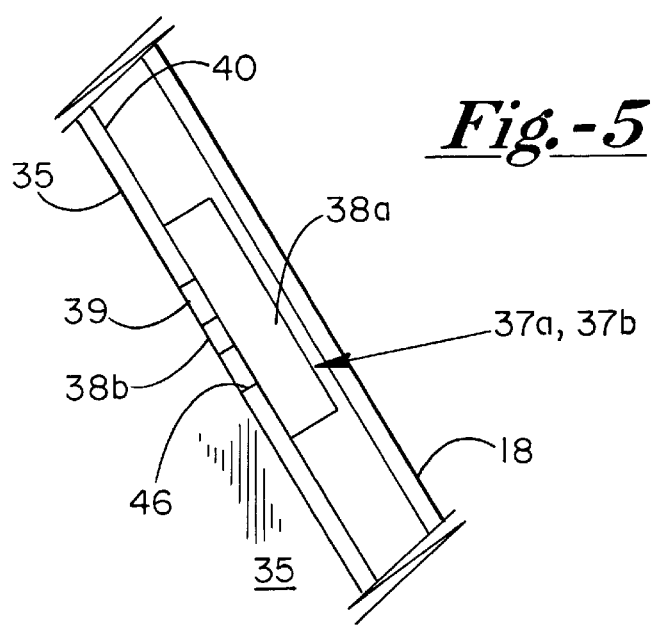
FIG. 5 shows an enlarged view of a motor key of the motor of FIG. 2.

As seen by also referring to FIGS. 2–5, an auger motor 30 consists of a drive motor 32, a gear reduction drive case 34 and drive shaft 36. Case 34 includes 5 keys secured to and extending from a bottom surface 35 thereof. Four such keys 37a are arranged concentrically around shaft 36 and the fifth key 37b extends from the end of case 34 beneath drive motor 32. As seen in FIG. 5, keys 37a and 37b include a disk portion 38a secured to a shaft portion 38b. Shaft portions 38b serve to space the disk portions 38a from the lower housing surface 35 of motor 30 creating a gap 39 there between.

A sheet metal support plate 40 is secured within dispenser 10 and is held in an angular orientation parallel to and spaced from a similarly angled portion of bin liner 18. Support plate 40 includes five keyway slots extending there through consisting of four concentrically oriented slots 42a and a fifth such slot 42b spaced therefrom. Each slot 42a and 42b includes a large diameter insertion end 45 and a narrower diameter slot portion 46. Plate 40 also includes a shaft hole 44 centrally of keyway slots 42a.

Figure 3:
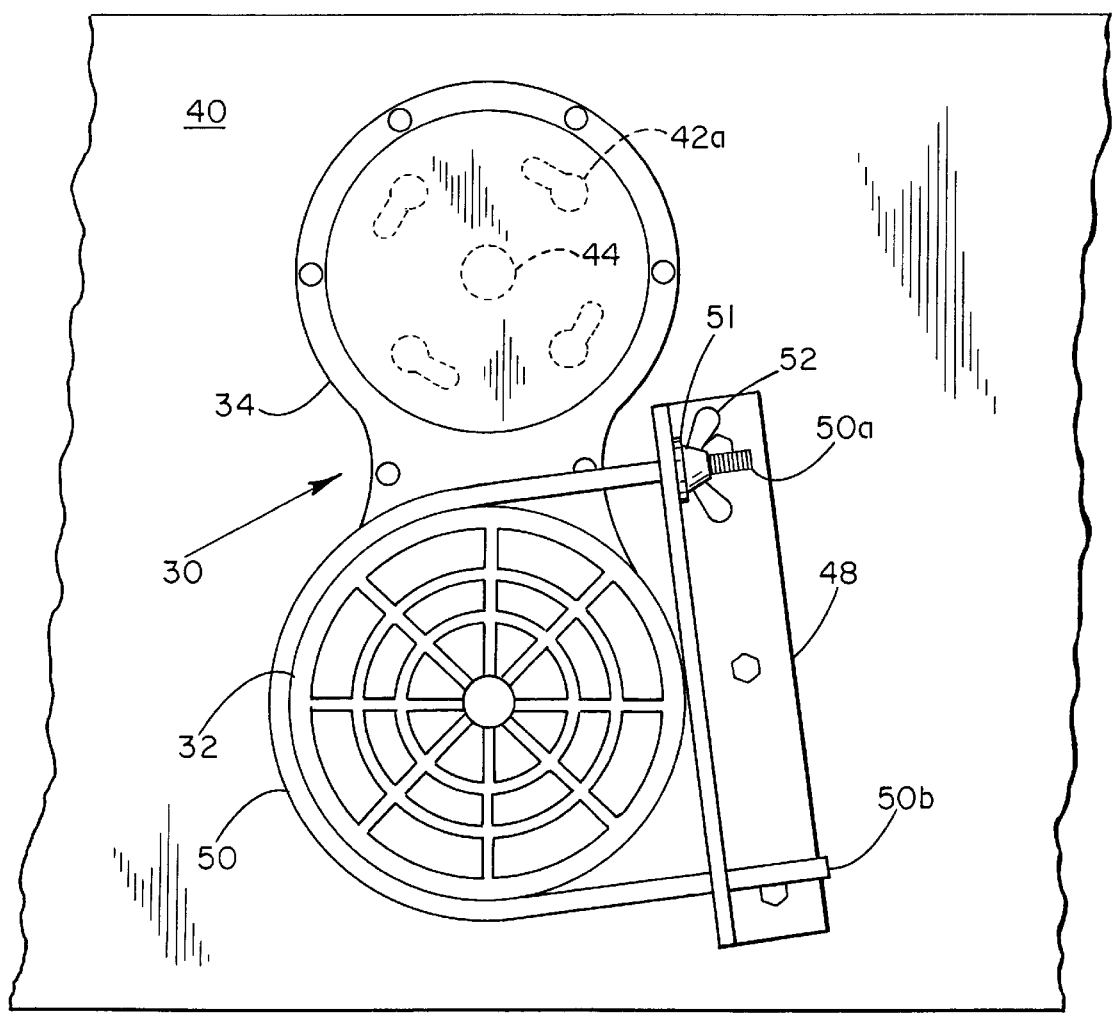
FIG. 3 shows a top plan view of the motor of FIG. 2.
Figure 4:
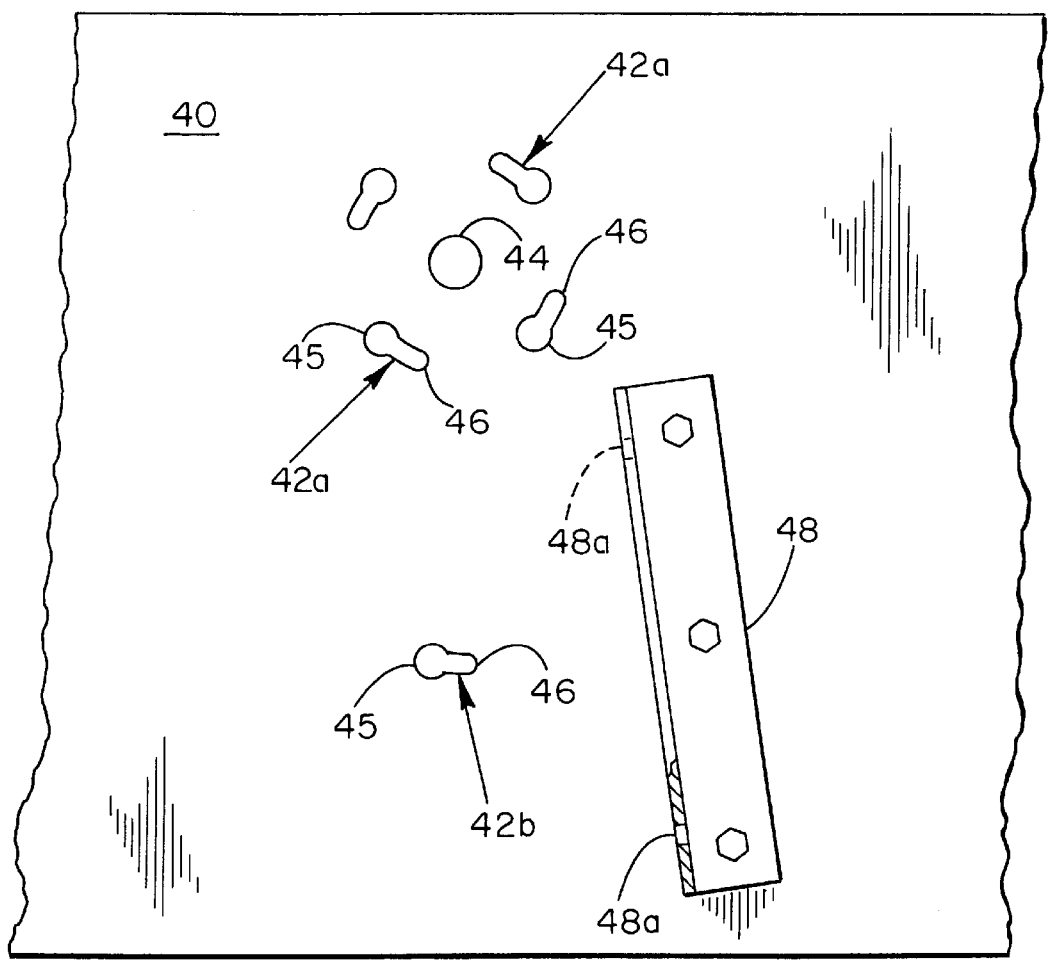
FIG. 4 shows a top plan view as per FIG. 3 with the motor removed.

A support flange 48 is secured to plate 40 and extends outward therefrom at a right angle thereto. Flange 48 includes two holes 48a for receiving opposite ends 50a and 50b of a U-shaped retaining rod 50. Rod 50 is threaded on end 50a thereof for receiving a washer 51 and wing nut 52 thereon. When motor 30 is secured to plate 40, shaft 36 extends through hole 44 thereof and also through a correspondingly aligned hole in bin liner 18. An auger/paddle wheel 54 is then secured to shaft 36 by, for example, a set screw. As is understood, motor 30 serves to rotatively drive auger/paddle wheel 54 in order to lift ice to chute 28 for dispensing of the ice there through down into a cup or other suitable receptacle. Auger/paddle wheel 54 can also serve the function of breaking up ice retained in bin area 15 and direct ice through hole 20 into lower bin 16. As seen in FIG. 3, when motor 30 is in place in dispenser 10 and secured to plate 40, U-shaped rod 50 extends around the body housing of motor 32 whereby the ends thereof extend through holes 48*a*. Wing nut 52 serves to tighten motor 30 against flange 48, thereby helping to retaining drive 30 in place on support plate 40. Rod end 50*b* simply extends sufficiently through a hole so that any rotation of rod 50 is prevented.

Mounting of motor 30 to support plate 40 involves the insertion of keys 37*a* and 37*b* into the large dimension ends 45 of corresponding keyway slots 42*a* and 42*b* respectively. Motor 30 is then rotated counter clockwise, from the perspective of FIG. 3, so that keys 42*a* and 42*b* secure motor 30 to plate 40. In particular, key shafts 38*b* move into slot portions 46 whereby a portion of plate 40 is then positioned in gap 39 between housing bottom surface 35 and disk portions 38*a*. U-shaped bolt 50 is then placed around motor 32 wherein holes 48*a* receive ends 50*a* and 50*b* thereof. Wing nut 52 is then threadably secured to end 50*a* and tightened thereon thereby securing motor 30 in place and preventing clockwise rotation thereof. In the case of dispenser 10, it will be understood by those of skill that access to motor 30 first requires the removal of splash panel 26.

Also, it will be understood that the central positioning of motor 30 below and behind ice chute 28 and between the beverage dispensing valve mounts 29 permits access to motor 30. Auger/paddle wheel 54 is, of course, secured to shaft 36 after motor 30 is secured to plate 40. Clearly, removal of motor 30 simply involves the reverse of the above procedure wherein, after removal of auger/paddle wheel 54 and bolt 50, motor 30 can be rotated clockwise to permit disengagement from plate 40. It will be understood that the above installation and removal procedures can be achieved manually and generally without even the need for simple hand tools.

What is claimed is:

1. A quick disconnect motor mounting, comprising:

a rigid motor support plate, the plate having a plurality of keyway slots for releasably receiving an equal plurality of keys, the keys secured to and extending from a common surface of a drive motor, the keyway slots for receiving the motor keys there through when the motor keys are aligned there with in a first drive motor position and for securing the keys to the support plate by rotation of the drive motor to a second position, and including means for releasably securing the drive motor in the second position and for preventing spontaneous movement thereof to the first position.

* * * * *